MAGNETIC MEMORY AND MAGNETIC SWITCH SYSTEMS

Filed Dec. 30, 1954 4 Sheets-Sheet 1

INVENTOR.
Jan A. Rajchman
BY Morris B. Rabau
ATTORNEY

MAGNETIC MEMORY AND MAGNETIC SWITCH SYSTEMS

Filed Dec. 30, 1954 4 Sheets-Sheet 2

INVENTOR.
Jan A. Rajchman
BY
Morris ... Rabkin
ATTORNEY

Oct. 23, 1956 J. A. RAJCHMAN 2,768,367

MAGNETIC MEMORY AND MAGNETIC SWITCH SYSTEMS

Filed Dec. 30, 1954 4 Sheets-Sheet 3

INVENTOR.
Jan A. Rajchman
BY Morris A. Rabin
ATTORNEY

INVENTOR.
Jan A. Rajchman
BY
Morris Robkin
ATTORNEY

United States Patent Office 2,768,367

Patented Oct. 23, 1956

2,768,367

MAGNETIC MEMORY AND MAGNETIC SWITCH SYSTEMS

Jan A. Rajchman, Princeton, N. J., assignor to Radio Corporation of America, a corporation of Delaware Application December 30, 1954, Serial No. 478,759

16 Claims. (Cl. 340—174)

Figures 1, 3:
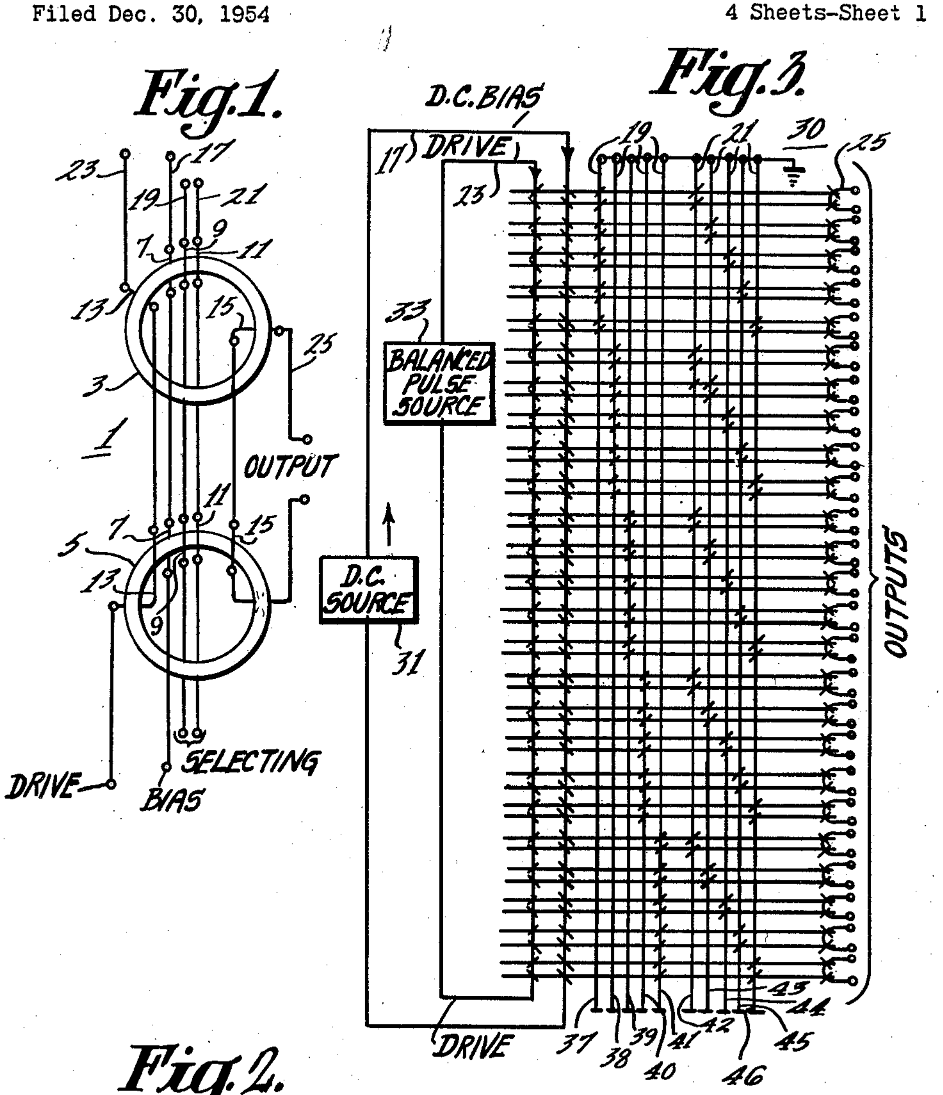

This invention relate to magnetic memory systems, and also to improved switching means for such systems.

In an article by Jan A. Rajchman, in the "Proceedings of the I. R. E.," for October 1953, entitled "A myriabit magnetic core matrix memory," there is described a memory system for storing information in arrays of magnetic cores. The array illustrated in the article is a two-dimensional array of memory cores arranged in rows and columns. The array is driven by two, different magnetic matrix switches. Each switch comprises an array of switch cores biased by a D. C. current. One switch is a column switch and another switch is a row switch. Each switch core of the column switch is linked to all the memory cores in one of the columns of the memory system by a column coil. Each switch core of the row switch is linked to the memory cores in one of the rows of the memory system by a row coil. A desired one of the memory cores is driven by operating the row and column switches to excite the one row switch core and the one column switch core which are coupled to the desired memory core. The switching program is symmetrical and comprises a first, positive pulse followed by a second, negative pulse. The two pulses are induced in the one row and the one column coil which are respectively coupled to the excited switch cores. The amplitude of each pulse is regulated so as to generate one-half the magnetizing force required to turn over a memory core. The row and column coil currents rise simultaneously and are constant for a time at least equal to the switch time of the memory cores. A binary one, arbitrarily represented by the state "P" of a memory core, or a binary zero, arbitrarily represented by the state "N," can be written into the desired memory core by terminating the current pulses furnished by the driven switch cores at different times, in the case of a binary one, and by terminating the current pulses simultaneously, in the case of a binary zero. Other memory systems employing asymmetrical current pulses comprising a full-amplitude, driving pulse of one polarity and a half-amplitude, inhibiting pulse of the other polarity are also known. In order to improve the access time of the prior memory systems, a differentiating resistance is placed in series with each of the respective column and row coils. The differentiating resistance aids the driving current in a coil in decaying rapidly to a zero value. Thus, the succeeding and opposite polarity current can be applied to the row and the column coils that much faster. The value of each of these resistances is made large with respect to the value of the effective inductance of the memory cores which are coupled to the respective column and row coils.

In certain of the prior magnetic memory systems, the driving currents are furnished by the selecting means. Because of the high coercive force of the magnetic material and the desired short access time, a very high power level is required. Thus, the selecting means are comprised of vacuum tubes capable of producing high output currents. In such case, the timing of the different selecting means is difficult because of the desired short access time.

It is an object of the present invention to provide a more efficient memory system wherein improved access time is obtained using only the self-resistance of the respective coils.

Another object of the present invention is to provide an improved switch means for a memory system whereby the timing of different driving currents is simplified.

Still another object of the present invention is to provide improved methods for writing information into and reading information out of a memory system.

Yet another object of the present invention is to provide an improved selecting system using low power level selecting means.

A further object of the present invention is to provide improved means for and an improved method of operating a memory system.

According to the invention, a magnetic switch is comprised of a plurality of pairs of magnetic cores. Each core of the respective core pairs is biased to one direction of saturation. A plurality of selecting windings, a drive winding, and an output winding are linked to each core. The drive windings are linked to the respective cores of a pair in opposite senses, that is, one winding is linked to one core of a pair in one sense and the other winding is linked to the other core of a pair in the opposite sense. The output windings of a core pair are also linked to the respective cores in opposite senses. The selecting windings are linked to the respective cores of a pair in the same sense. All the drive windings are serially connected and comprise a drive coil. The output windings of the individual core pairs are serially connected and comprise a plurality of different output coils, one for each core pair. The selecting windings of the core pairs are serially connected in combinatorial fashion and comprise selecting coils. Each core pair has a different combination of the selecting coils linked thereto.

The switch is operated by selecting a desired combination of selecting coils to drive one core pair substantially to the zero induction condition. Only a relatively low power is required for each selecting coil because the selecting means do not furnish the currents for driving the memory cores. The flux changes caused by exciting the core pair to the zero induction condition induce voltages in the output coil which cancel each other due to the series opposition connection of the output windings. At some later time, a balanced drive pulse comprising a first phase of one polarity and a second phase of the opposite polarity is applied to the drive coil. The first phase drives one core of the selected pair from zero saturation towards positive saturation and the other core of the selected pair from zero saturation towards negative saturation. The flux changes are opposite and induce aiding voltages of one polarity in the output coil of the selected core pair. Similarly, the second phase of the drive pulse excites the two cores of the selected core pair and aiding voltages of the polarity opposite to the one polarity are induced in the output coil. Substantially no flux change is produced by the drive pulse in the non-selected core pairs. Therefore, practically no disturbing voltages are induced in the non-selected output coils. The drive pulse is reproduced in the output coil of a selected pair without requiring a differentiating resistance. By applying a second drive pulse whose phases are opposite to the phases of the first drive pulse, a simple program for writing information into and reading information out of a memory can be achieved.

The present invention also includes other arrangements of the magnetic switch, and novel arrangements of a plurality of switches of the present invention for driving a magnetic memory.

Figure 2:
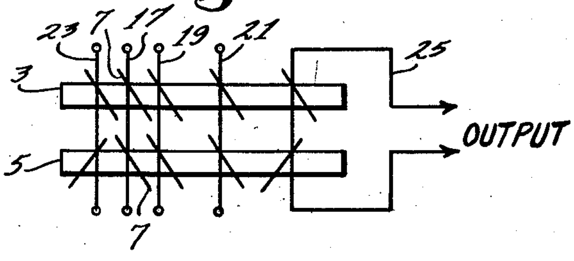
Figure 4:
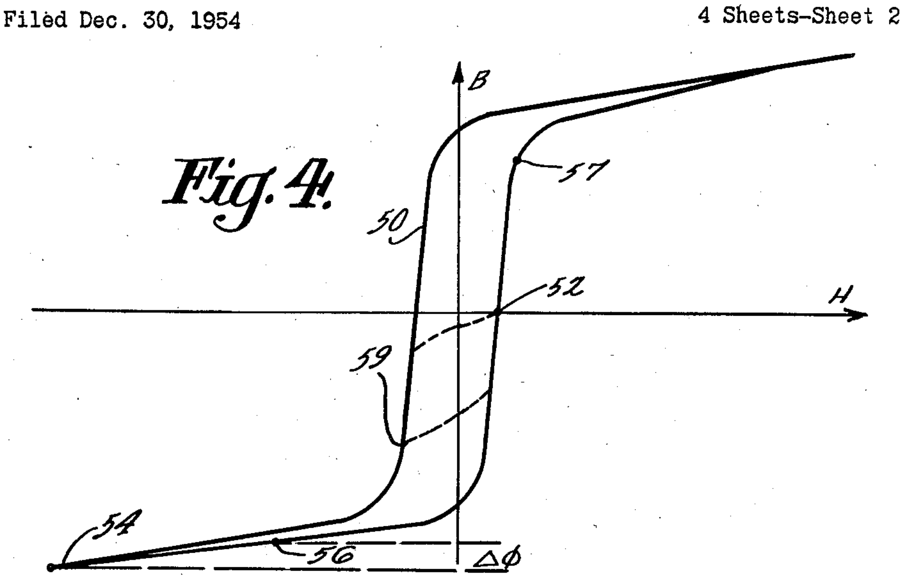
Figure 5:
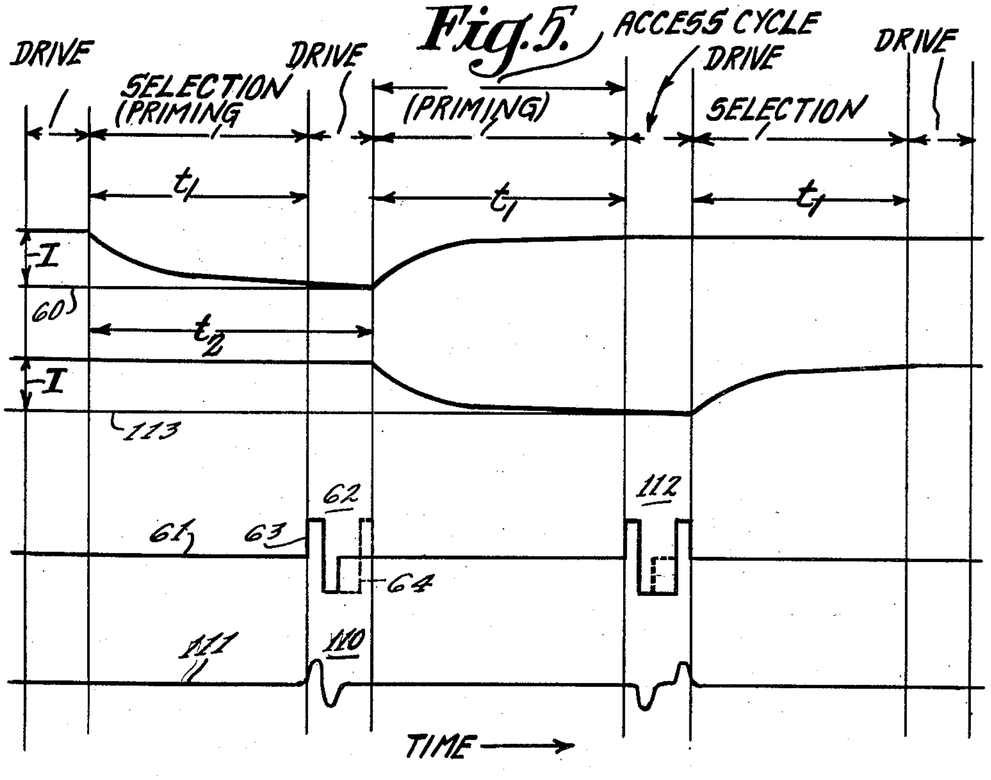
Figure 6:
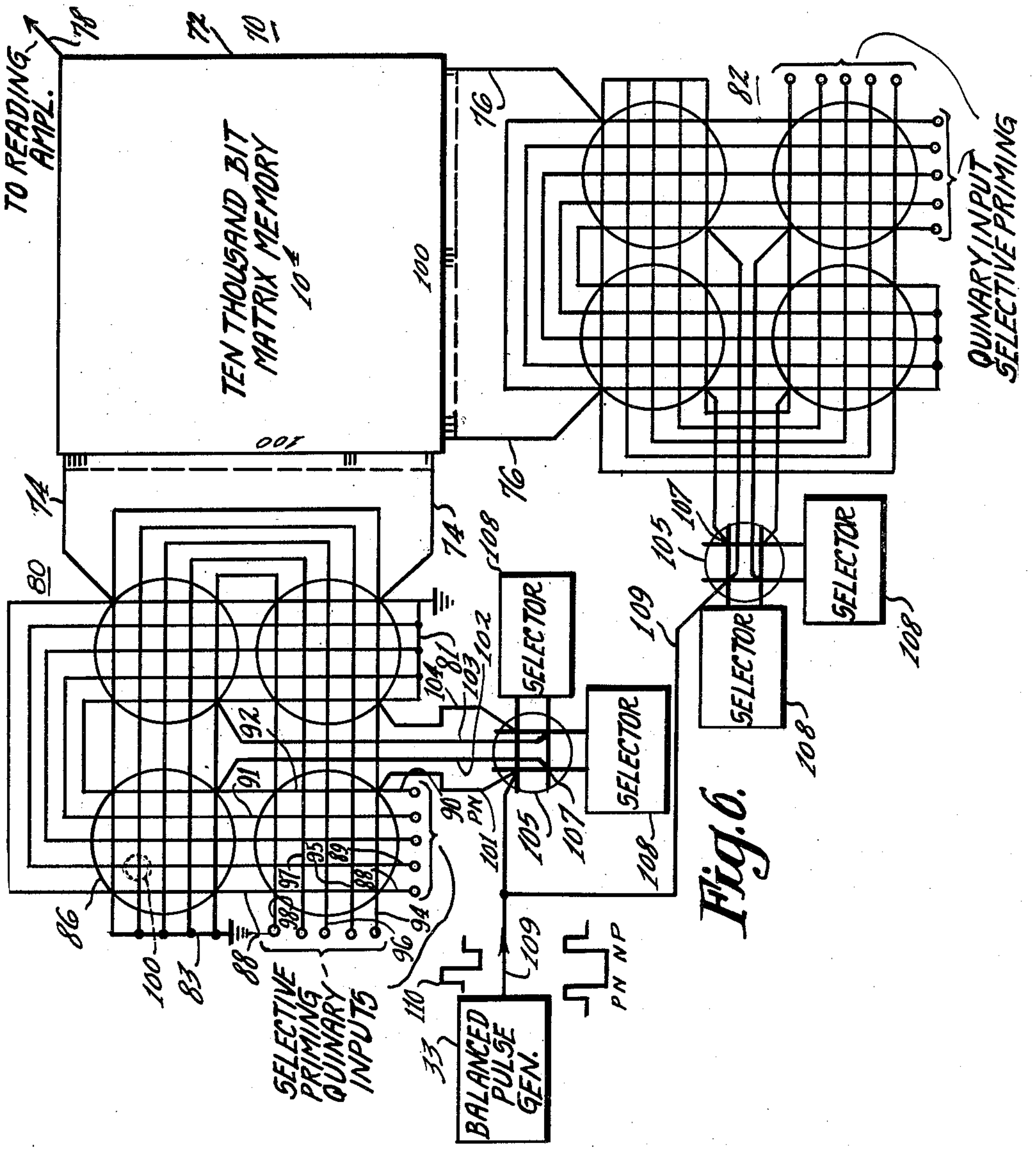
Figure 7:
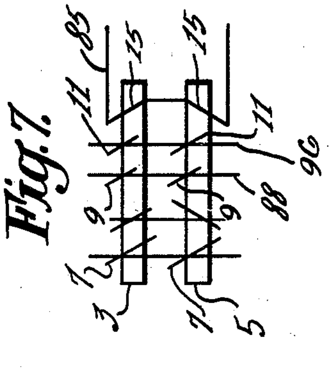
Figure 8:
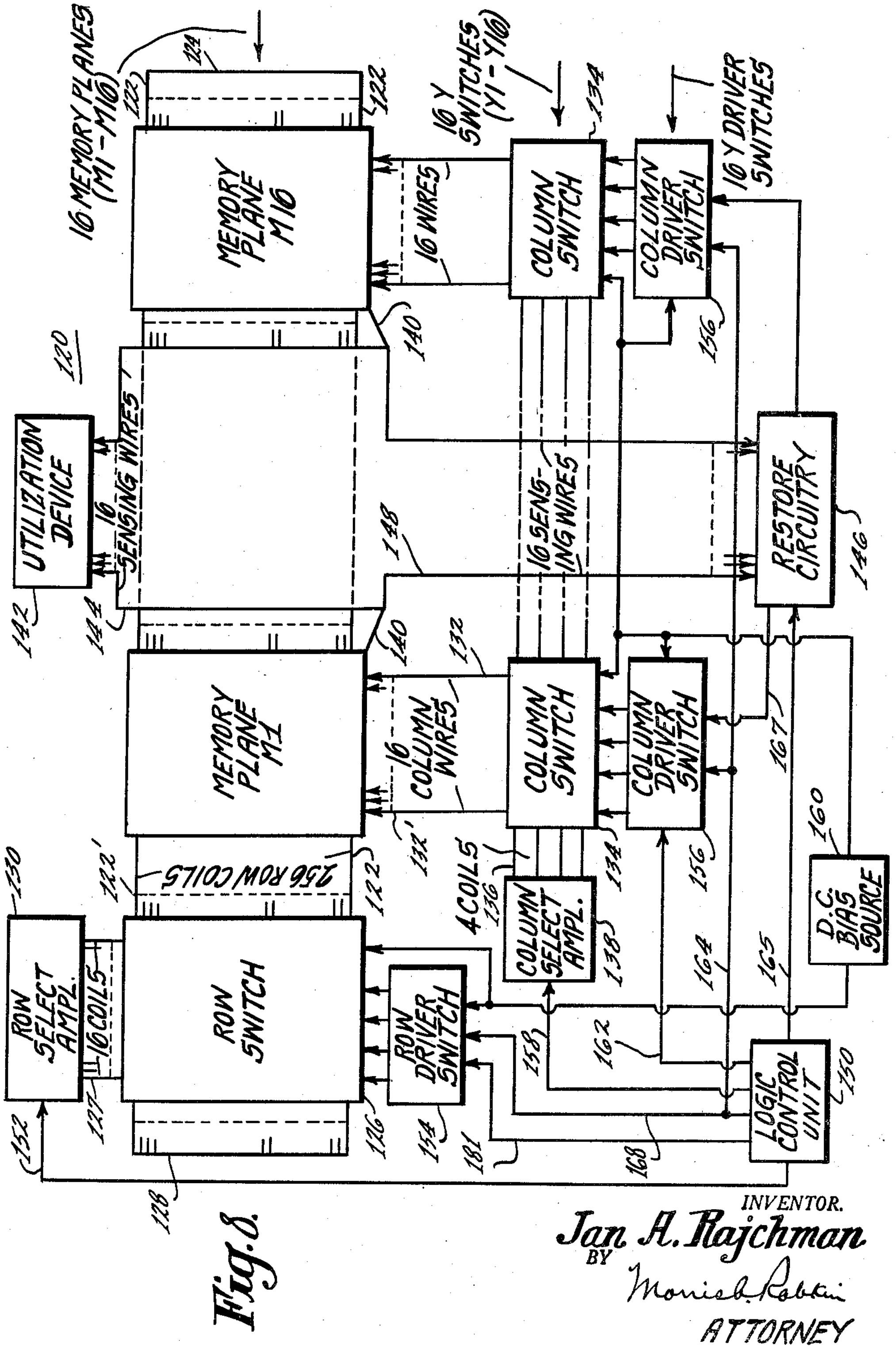

The invention will be more fully understood, both as to its organization and method of operation, from the following description when in connection with the accompanying drawing in which like reference numerals refer to similar parts, and wherein;

Fig. 1 is a schematic diagram of a core pair and windings thereof and illustrates the manner in which the windings are linked to the two cores of a core pair, Fig. 2 is a schematic diagram of a core pair which adopts a convention for representing the cores and for representing the sense in which the various windings are linked to the cores, Fig. 3 is a schematic drawing using the convention of Fig. 2 and is one arrangement of the core pairs to form a combinatorial switch, Fig. 4 is a graph, somewhat idealized, of the hysteresis, loop of a core which is useful in explaining the operation of the invention, Fig. 5 is a graph of waveforms which are useful in explaining the operation of the memory systems of Figs. 6 and 8, Fig. 6 is a schematic diagram of the arrangement of two magnetic switches according to the present invention in a two-dimensional memory system, Fig. 7 is a detailed schematic drawing, using the convention of Fig. 2, of a core pair of one of the switches of the memory system of Fig. 6, and Fig. 8 is a schematic arrangement of another memory system according to the present invention.

Referring to Fig. 1, the core pair 1 is comprised of a first core 3 and a second core 5. Each of the cores is comprised of a magnetic material characterized by a substantially rectangular hysteresis loop. Certain ferrite materials such as manganese-magnesium ferrite, and certain metallic materials such as mopermalloy exhibit the desired hysteresis characteristic. Each of the cores 3 and 5 has a bias winding 7, a pair of selecting windings 9, 11, a drive winding 13, and an output winding 15 linked thereto. The bias winding 7 of the core 3 is connected in series aiding relation to the bias winding 7 of the core 5 to form a bias coil 17. By series aiding relation is meant that a current in a coil causes a flux change in the same direction both in the core 3 and in the core 5. The selecting windings 9 and 11 are connected in series aiding relation to the corresponding selecting winding 9 and 11 of the core 5 to form the respective selecting coils 19 and 21. The drive winding 13 of the core 3 is connected in series opposition to the drive winding 13 of the core 5 to form a drive coil 23. By series opposition is meant that a current flowing in a coil induces a flux change in one direction in one core of the pair and a flux change in the opposite direction in the other core of the pair. Conversely, opposite directions of flux changes in the cores of a pair induce like polarity voltages in a series opposition connected coil. The output winding 15 of the core 3 is connected in series opposition to the output winding 15 of the core 5 to form an output coil 25.

For the purpose of simplification of the drawing, the convention shown in Fig. 2 is adopted herein. In this convention, a core is represented as an elongated rectangle. A winding linked to a core is represented in the drawing by a slanted line making an acute angle with the core. The sense of the winding is represented by the direction of the acute angle, as viewed in the drawing. An acute angle to the left represents a P (positive) sense winding and an acute angle to the right represents an N (negative) sense winding. A multi-turn winding is represented by a number of such lines. The vertical line connecting one or more of the slanted lines represents the serial connection of the winding to form a coil. For example, the bias coil 17 is connected in series aiding relation to the bias winding 7 of the core 3 and to the bias winding 7 of the core 5.

A similar core pair and the operation thereof is described in detail in the copending application, Serial No. 339,861, entitled "Magnetic Switching Device," filed by Jan A. Rajchman on March 2, 1953. The above switching device is employed as a means for switching modulated A. C. signals from a modulated signal source to a desired one out of $n$ channel outputs in accordance with a combinatorial code applied to the selecting windings.

In Fig. 3, there is shown an illustrative arrangement of twenty-five of the core pairs 1 arranged to form a combinatorial switch 30 according to the present invention. Both terminals of the bias coil 17 are connected to a conventional D. C. current source 31, for example, a battery and a series connected resistance. Both terminals of the drive coil 23 are connected to a balanced pulse drive source 33 which may be any source, for example, a blocking oscillator circuit arranged to furnish a balanced pulse having a first phase of one polarity and a second phase of the opposite polarity. A first set of five different selecting coils 19 and a second set of five different selecting coils 21 are provided. Each of the coils of the first set of selecting coils 19 is connected to the selecting windings 9 of a different group of five of the core pairs 1. Each coil of the second set of selecting coils 21 is linked to the selecting windings 21 of a corresponding core pair 1 in each group of five core pairs 1. One terminal of each of the individual selecting coils 19 and 21 is connected to a common ground indicated in the drawing by the conventional ground symbol. The other terminal of each of the selecting coils 19 of the first set is connected to a different one of a set of five switches which may, for example, be the triode tubes 37 through 41. The other terminal of each of the selecting coils 21 of the second set is connected to a different one of another set of switches, for example, the five triode tubes 42 through 46. A different output coil 25 is provided for each core pair 1.

The operation of the switch 30 is explained in connection with the representative hysteresis loop 50 of Fig. 4 and the waveforms 60 and 61 of Fig. 5. The hysteresis loop 50 is the operating loop of any core of the switch cores 3 and 5 of a core pair 1, and conveniently, may be the major loop for the magnetic material, A D. C. bias is applied to each of the cores of the switch by applying a suitable current to the bias coil 17. The amplitude of the bias current is sufficient to magnetize each of the cores to a zero induction condition as represented by the point 52 of the hysteresis loop 50. Each of the tubes in both sets of selecting vacuum tubes is conducting and a current is flowing in each of the selecting coils 19 and 21. The ampitude of the selecting currents is regulated such that each core is excited to the negative direction of saturation as represented by the point 54 of the loop 50. The amplitude of both the D. C. bias current and the selecting currents is determined from the particular hysteresis loop of the material, and, in general, depends upon the previous history of a core. In the present embodiment, however, the largest operating loop for each of the cores is the major loop and is determined by the largest value of the respective drive and selecting currents used. Consequently, the value of the D. C. bias current required for bringing a core to a zero induction condition is well determined.

A particular one of the core pairs 1 is selected by rendering one of the selecting triodes in the first set and one of the selecting triodes in the second set non-conducting. For example, the topmost core pair 1 may be selected by rendering the triodes 37 and 42 non-conducting, as by applying a negative pulse to each control grid. The cores 3 and 5 of the topmost core pair 1 are, therefore, returned to the zero induction condition by the D. C. bias current. The remaining cores in the top quintet partially return towards the zero induction condition to the state represented by the point 56 of the loop 50 due to the triode 37 being rendered non-conducting. Because the magnetic material is not perfectly rectangular, a flux change $\Delta\phi$ occurs in each core of these four core pairs. A flux change $\Delta\phi$ also occurs in each core linked by the selecting winding 21 which is connected to the triode 42. The flux change $\Delta\phi$ induces a disturbing voltage in the respective output windings 15 of the cores 3 and 5 of these half-selected core pairs. However, because of the series opposition connection of the respective output coils 25, these voltages cancel. Also, the selected core pair 1 has equal and opposite disturbing voltages induced in its output windings 15 when the state of the cores 3 and 5 is returned to the zero induction condition. These voltages likewise cancel each other in the output coil 25 of the selected core pair 1.

Observe that the selection of a desired core pair is a pure digital one because the amplitude of the pulse applied to the selecting triode tube in each set does not determine the state of the selected cores 3 and 5 as was the case in certain prior magnetic switches. Instead, the state of the selected core is determined by a single D. C. current which can be closely regulated. This is particularly advantageous in digital machines because the amplitude of the selecting pulses need not be closely regulated and a consequent saving in equipment can be obtained. The waveform 60 of Fig. 5 illustrates the current flow in each of the two selecting coils 19 and 21 which current decays exponentially from its initial amplitude I to a substantially zero amplitude in a time $t_1$.

Assume, now, that after the time $t_1$, the balanced drive pulse 62 of the waveform 61 is applied to the drive coil 23 by the balanced pulse generator 33. The balanced pulse 62 comprises a first, positive phase 63 and a second, negative phase 64. The first positive phase excites the core 3 of the selected core pair 1 from the zero induction condition towards the positive direction of saturation along the one branch of the hysteresis loop 50 (Fig. 4), to a state represented by the point 57. Similarly, the first, positive phase 63 drives the core 5 of the selected core pair 1 across to the other branch, as indicated by the dotted line and towards the negative direction of saturation along this other branch to a state represented by the point 59. The two voltages respectively induced in the output windings 15 of the cores 3 and 5 are additive in the output coil 25 of the selected core pair. The core 3 of the remaining half-selected core pairs 1 is excited by the first, positive phase 63 of the balanced drive pulse 62 from the point 56 toward a positive direction of saturation along the bottom, flat portion of the hysteresis loop 50, and similarly, the core 5 of each of the half-selected core pairs 1 is excited from the point 56 into further saturation in the N direction. Because the magnetic excursion of each core 3 and 5 of the respective half-selected core pair 1 is in a different direction from the point 56, there may be slight voltages induced in the respective output windings 15 of a core pair because of the imperfect saturation condition of the materials used. These disturbing voltages are additive in the respective output coils 25. The amplitude of the net disturbing voltage appearing in any one output coil 25 of a half-selected core pair depends on the slope of the lower portion of the hysteresis characteristic in the neighborhood of the point 56. Thus, it is desirable to select a material for which the ratios of the slopes at saturation (points 56 and 54) to the maximum slope (point 52) are as small as possible in order to maximize the discrimination between the desired output voltage and the disturbing voltage.

The effective ratio of the slopes between the unselected position (point 52) of a core pair may be increased by employing the system described in the above-mentioned application, Serial No. 339,861. Briefly, this system comprises a quartet of cores in each switch position instead of a core pair. The additional core pair is connected in the same manner as the individual core pairs described above except that the cores are biased to the P direction of saturation. The output coils of each of the pairs of a quartet are connected to form another different output coil. Also, one pair of the quartet may be comprised of a magnetic material having a linear hysteresis characteristic.

The second, negative phase 64 of the balanced drive pulse 62 (Fig. 5) returns the cores 3 and 5 of the selected pair back to substantially the zero induction condition as represented by the point 52 of the loop 50. A relatively large, output voltage opposite to the polarity of the first output voltage is induced in the output coil 25 of the selected core pair 1. Likewise, a very small, or no disturbing voltages are induced in the output coils 25 of each half-selected core pair 1.

The advantage derived from thus employing the selecting and drive currents is that the selecting current source is required to supply only the magnetizing current required to change the cores 3 and 5 of a core pair from the low permeability region at the point 56 to the high permeability region at the point 52. Therefore, in practice, the means for furnishing the various selecting currents may be low power level devices, for example, transistors. In the case of metallic cores, eddy currents flow and a different time from the period $t_1$ of Fig. 4 may be required for the cores 3 and 5 of the selected core pair to settle to the zero induction condition because of the opposing effects of the eddy currents. The period $t_1$ can be shortened either by applying a small, positive overshoot to the selecting coils or by applying a small amplitude, positive pulse to the D. C. bias coil during the selection time interval. In systems employing cores of ferrite or ferrospinel material, there are substantially no eddy currents, and therefore, the time interval required for a core to settle to the zero induction condition is extremely short.

In Fig. 6, the memory system 70 is comprised of an array 72 of 10,000 memory cores arranged in 100 rows and 100 columns. The array 70 may be a double-coincident magnetic array and may be similar to that described in the above-mentioned article by Jan A. Rajchman entitled "A myriabit magnetic matrix memory." Thus, each memory core is linked by a different one of the row windings 74, by a different one of the column windings 76 and by a sensing winding 78. Each row winding 74 is connected to one output of a row switch 80. The row switch 80 is comprised of a 25×4 array of the core pairs 1. Each column winding 76 is connected to a different one of the outputs of a column switch 82. The row switch 80 and the column switch 82 are similar. Therefore, only the arrangement of the row switch 80 is described. The row switch 80 has four different quadrants. Each quadrant is set out by a circle 86 and contains a group of twenty-five of the core pairs 1. Five different column selecting coils 88 through 92 and five different row selecting coils 94 through 98 are provided. Each intersection of a row and column coil in the top two and the bottom two of the quadrants 86 represent a core pair.

The core pair 1 at the intersection encircled by the dotted line 100 is shown in detail in Fig. 7 and comprises a core 3 and a core 5. In Fig. 7, the selecting row coil 96 and the selecting column coil 87 of the row switch 80 are connected in series aiding relation to the respective selecting windings 9 and 11 of the cores 3 and 5. The D. C. bias coil 17 (not shown in detail in the switch 80 of Fig. 6) is connected in series aiding relation to the respective bias windings 7 of the cores 3 and 5 and operates to bias every core pair 1 of the switch 80 to the zero induction condition as explained previously. The output windings 17 of the cores 3 and 5 are connected in series opposition to form the output coil 85.

Referring again to Fig. 6, the row coil 88 is connected to the row winding of each core 3 and 5 of five different core pairs 1 in each of the four quadrants, and is then connected to a common terminal 81, indicated by the conventional ground symbol. Likewise, each of the row coils 89 through 92 are connected in series aiding relation to the selecting windings of five of the core pairs in each quadrant, and each of these five coils is also connected to the common terminal 81. Each column coil 94 through 98 is connected in combinatorial fashion to five different ones of the core pairs in each of the quadrants, and is then connected to a common terminal 83, indicated by the conventional ground. There is an individual output coil 85 for each core pair. One terminal of each of the output coils 85 is connected to the common ground. The other terminal of each output coil 85 is connected to a respective one of the row windings 74 of the memory array 72.

An individual one of the four drive coils 101 through 104 is connected in series opposition to the drive windings 13 of each of the core pairs 1 in one of the quadrants. A particular one of the drive coils 101 through 104 is selected by the 2 × 2 matrix 105 which is illustrated by two vertical lines intersecting two other horizontal lines to form four different intersections 107. Each of the intersections 107 may be comprised of a core pair 1. The vertical columns and the horizontal rows of the matrices 105 are each connected to one of two different selecting means (sel.) 108 which operate to select one core pair in accordance with two different binary inputs. Each of the core pairs 1 represented by the intersection 107 has a drive coil 109 connecting the drive windings of the two cores of each pair in series opposition. The drive coil 109 is connected to the output of the balanced pulse generator 33. The drive coil 109 is also connected in parallel with a similar 2 × 2 array 105 of the core pairs 1 which array is used to drive the selected core pair 1 in a selected one of the quadrants of the column switch 82.

The operation of the memory system 70 may be as follows: Assume that it is desired to write a binary one, represented by the state P, in a desired one of the memory cores of the array 72. One row winding 74 and one column winding 76 intersect in the desired memory core. The row and column address of the desired memory core is furnished in two steps by auxiliary equipment, which may be, for example, a digital computer. The first step comprises priming one core pair in each quadrant of the row switch 80 and the column switch 82. This priming is preferably simultaneous in order to reduce the access time. A core pair in each quadrant is selected by removing the current from the one row selecting coil and the one column selecting coil which are respectively connected to the selected windings 9 and 11 of the one row core pair in each of the quadrants 86. The second step comprises selecting one of the quadrants by applying the binary address of the desired quadrant to the selecting means 108 of the 2 × 2 arrays 105 thereby priming a core pair 107 in each of the 2 × 2 arrays. After the core pairs of the row and column switches are primed, a drive pulse 110 is applied by the balanced pulse generator 33 to all the core pairs of both the 2 × 2 arrays 105. The selected core pair in each array 105 furnishes a balanced drive pulse, substantially the same as the drive pulse 110, on its output coil. This drive pulse is applied by one array 105 to all the core pairs 1 of one quadrant 86 of the row switch 80 and by the other array 105 to all the core pairs 1 of one quadrant 86 of the column switch 82. The primed core pair in the selected quadrants furnish a balanced drive pulse similar to the pulse 62 of Fig. 5 to the one row winding 74 and the one column winding 76 which intersect in the desired memory core. The coincidence of the first phase 63 of the drive pulses 62 in the desired memory core generates sufficient magnetizing force to excite it to the state P and the coincidence of the negative phase of the drive pulses 62 generates sufficient magnetizing force to return the memory core back to the state N. Therefore, the desired memory core of the array 72 is first driven to the state P and then to the state N. At the end of the balanced pulses 62, the desired memory core is at the state N regardless of its initial state of magnetization. All disturbing currents produced by the half-selected core pairs 1 are of substantially zero amplitude. There are substantially no secondary currents flowing in the excited row coil 74 and the column coil 76 at the termination of the drive pulse 62. Therefore, the row and column switches need not be left for a predetermined time in order to allow the magnetic energy stored in the inductance of the driven core pair to dissipate across a high resistance as is the case when a single polarity, unbalanced drive pulse is employed. One manner of viewing the effect of the balanced pulse is to consider that the flow of current in a pure inductance is completely stopped by applying a voltage tending to produce an equal current of the opposite polarity through the inductance thereby cancelling the previously flowing circuit and, consequently, the stored energy. Accordingly, one advantage of using a balanced system is that the time interval of the drive pulse need be only of a duration necessary to turn over the selected memory core, and no longer. When the memory cores are comprised of appropriate ferrite or ferro-spinel materials, this turn-over time is extremely short and may be in the order of ⅓ of a microsecond or less, when information is written into a memory core by means of the core pairs and the balanced drive.

The balanced system of the present invention permits the employment of either a balanced PN drive pulse or a balanced NP drive pulse. Thus, the writing of a binary one or a binary zero into a desired memory core is simplified. For example, when it is desired to write a binary zero, the drive pulse is comprised of a first positive phase followed by a second negative phase. When it is desired to write a binary one, the drive pulse is comprised of a first negative phase followed by a second positive phase. The last phase of the drive pulse determines the written information. The prior switching systems generally employed a drive which is of a single order of polarity, for example, a first P pulse, and subsequently, a second N pulse. Thus, in certain prior systems, the interrogation of a desired memory core was carried out by employing a first pulse of a given polarity, which, in practice, always preceded a restoration employing a pulse of the opposite polarity.

Information may be read out of the memory array 72 by operating the row switch 80 and the column switch 82 thereby applying a balanced drive pulse which has one order of polarity, for example, PN from each switch. The output voltage induced in the output winding 78 during the first phase of the drive pulses is observed. For example, if a binary zero was originally stored in the interrogated memory core, the first positive phase of the driving pulses reverses the state of this memory core to the state P and the second, negative phase returns the memory core back to the state N. Therefore, the output pulses 110 of the waveform 111 are induced in the output winding 78. If the interrogated memory core is in the state P, there will be substantially no output voltage during the first positive phase of the drive pulse, and a relatively large output voltage during the second negative phase of the drive pulse. Thus, the information stored in a memory core can be ascertained by observing the amplitude of the voltage induced in the output winding 78 during the first positive phase of the drive pulses. Alternatively, the output voltage induced in the sensing winding 78 may be integrated during the entire time interval of the driving pulses. The resulting amplitude of the integrated voltage output then indicates what the initial state was of the selected memory core in a manner providing a high signal-to-noise ratio. A system employing integration of the output voltage induced in an output winding during a PN cycle is described in an application, Serial No. 353,817 entitled "Magnetic Memory System," filed by Jan A. Rajchman et al., on May 8, 1953.

In the memory system of Fig. 6, the information readout of the selected memory core can be restored by selectively following the first PN balanced drive pulse by a balanced NP drive pulse. The voltage induced in the output coil 78 determines whether or not the PN drive is followed by the NP drive. Thus, referring to the waveforms 61 and 111 of Fig. 5, when the selected memory core was initially in the state N, the NP drive is not applied as indicated by the dotted lines. However, when the selected memory core was initially in the state P, the NP drive 112 is applied. The initial selection is carried out in the time $t_1$ during which the two core pairs of the respective matrix switches are selected. A complete access cycle is carried out in the time $t_2$ and includes the additional time for applying the balanced drive pulses used for interrogation and restoration. During any one access cycle $t_2$, the selecting currents of the last selected core pair of the row and the column switches are allowed to increase to a normal inhibit amplitude I and, but not necessarily, the selecting currents of the core pairs at another memory position are allowed to decay from a value I to a zero value, as illustrated by the respective waveforms 60 and 113 of Fig. 5. There is no upper limit to the time required for the initial selection, the longer the time $t_1$, the smaller the voltage drop across a selecting coil and, therefore, a consequent reduction in the power required for a selection. A short, dead time "D" may be employed intermediate the PN and the NP balanced pulses in order to allow for proper operation of the logical gates of the auxiliary equipment.

In Fig. 8, there is shown a memory system 120 having a capacity of 256 words each having sixteen binary digits. For convenience of drawing, the sixteen memory planes M1 through M16 are shown in two dimensions. Each of the memory planes comprises a rectangular array having 256 columns and sixteen rows. A respective binary digit of a word is stored in a corresponding position in each of the memory planes. Two hundred and fifty-six different row coils 122 are provided. Each row coil is linked to a corresponding row of memory cores in each of the memory planes. The row coils 122 are terminated at the memory end of the system in a common conductor 124. Each of the row coils is connected in series opposition to the output windings of a respective one of the 256 core pairs of a row switch 126. The other end of each row coil 122 is terminated at the switch end of the system in a common conductor 128. The row switch 126 may conveniently be arranged in four different quadrants each having 64 core pairs. Each core pair is provided with four different selecting windings. The four selecting windings of the respective core pairs in each quadrant are connected in combinatorial fashion to form sixteen row coils 127 for selecting one core pair in each quadrant, i. e. the row windings of alternate halves, quarters, eights, and sixteenths of the core pairs are connected to a different one of the row coils 127. Each of the sixteen different selecting coils 127 of the row switch 126 are connected to a respective one of the outputs of sixteen row-select amplifiers 130.

Each column of memory cores of each memory plane M1—M16 is linked by a respective one of sixteen different column coils 132. Sixteen different column switches 134 are provided. Each column switch 134 has sixteen different core pairs and may be divided into four different quadrants, each quadrant having four different ones of the core pairs. Four different selecting coils 136 are provided. Each two of the selecting coils 136 are connected in combinatorial fashion to two different ones of the selecting windings of the four core pairs in each quadrant. Each of the selecting coils 136 is connected to a respective one of the outputs of four different column-select amplifiers 138. Every memory core in a respective one of the memory planes is linked by a sensing winding 140. Each of the sensing windings 140 is connected to a utilization device 142 by means of a different one of the conductors 144, and to one of the inputs of a restore circuitry 146 by means of a different one of the conductors 148. The utilization device 142 may be any device responsive to a voltage induced in a sensing winding 140 when a memory core is driven from one direction of saturation to the other. The restore circuitry 146 comprises an assemblage of gates and flip-flops which is responsive to a voltage induced in a sensing winding by a driven core to pass the subsequent balanced drive pulse for restoring the information read out of the selected memory core.

A logic control unit 150 is provided. This circuit may be any device arranged for furnishing the address of the desired word and the pulse program required for reading or writing information into the desired memory address. The four different binary digits used for selecting one core pair in each of the quadrants of the row switch 126 are supplied by the logic control unit 150 as electrical signals on four different ones of the sixteen leads of a trunk line 152.

A row driver switch 154 comprising a 2×2 array of four different core pairs is provided. The output windings of a respective one of these core pairs is connected to the drive windings of every core pair in one of the four quadrants of the row switch 126. A particular one of the four core pairs of the row driver switch 154 is selected by means of two binary inputs which are connected to four different outputs of the logic control unit 150 by means of four leads of the trunk line 161. Each of the column switches 134 has associated therewith a similar column driver switch 156 for selecting the core pairs in a respective one of the four quadrants of each of the column switches 134. A particular core pair in each quadrant of every column switch 134 is selected by the combination of signals applied by the logic control unit 150 on two different ones of the four leads of a trunk line 158. The four leads of the trunk line 158 are connected to the input of a respective one of four different column selecting amplifiers 138. A particular one of the core pairs of each of the column driver switches 134 is selected by means of two different binary inputs which are connected to four different outputs of the logic control unit 150 by means of a trunk line 162. An output of the logic control unit 150 which furnishes the balanced drive pulse is connected via the conductor 163 to the row driver switch 154. A set of outputs of the logic control unit which selectively furnish a balanced drive pulse is connected via the trunk line 164 to each individual one of the column driver switches 156. A D. C. source 160 is connected to the row switch 126, the row driver switch 154, each column switch 134 and each column driver 156. The D. C. bias is arranged for providing sufficient magnetizing force to bias every core of every one of the core pairs to its zero induction condition.

The operation of the memory system 120 may be as follows: Each of the row selecting amplifiers 130 and the column selecting amplifiers 138 excites the respective cores of each core pair of the row and column switches to the one direction of saturation. Assume, now, that it is desired to write a binary word into the memory position represented by the memory core located at the intersection of the first row and the first column in each of the memory planes. For convenience of description, the operation will be discussed in connection with the first memory plane M1 only because a similar operation takes place in each of the remaining memory planes.

The desired memory core in the plane M1 is intersected by the row coil 122′ and the column coil 132′. The first part of the address of the row coil 122′ is furnished by the logic control unit 150 as a combination of voltage levels on four of the leads of the trunk line 152, thereby rendering four different ones of the row-selecting amplifiers 130 non-conducting. Thus, the voltage applied by these four amplifiers is removed from the four selecting windings of one core pair in each quadrant. This one core pair is then brought to the zero induction condition by the D. C. bias. Similarly, the first part of address of the column coil 132', comprising voltage levels, is furnished by the logic control unit 150 on two different ones of the four leads of the trunk line 158 thereby rendering two of the column-selecting amplifiers 138 non-conducting. The output current from these two amplifiers is removed from the two selecting windings of one core pair in each quadrant of each column switch 134. Therefore, each of these core pairs is primed by being brought to the zero induction condition by the D. C. bias. The second part of the address of the row coil 22' is furnished by the logic control unit 150 as, for example, by a combination of voltage levels, to the row driver switch 154 thereby causing one of its core pairs to be brought to the zero induction condition by the D. C. bias. Likewise, the second part of the address of the colunm coil 132' is furnished by the logic control unit 150 to the column driver switch 156 thereby priming the two cores of one of its core pairs.

The logic control unit 150 then furnishes one full-amplitude, balanced drive pulse comprising a first positive phase and a second negative phase to the row driver switch 154 via the conductor 163. Another half-amplitude, balanced drive pulse whose phases are opposite to those of the row driver pulse is furnished to the column driver switch 156 associated with the plane M1 via one lead of the trunk line 164. This one drive pulse is passed by the one primed core pair of the row driver switch 154 to each core pair of one quadrant of the row switch 126. The other balanced drive pulse is passed by the primed core pair of the column driver switch to each of the core pairs of one quadrant of the column switch 134 associated with the plane M1. The full-amplitude, balanced drive pulse from the row driver switch 154 causes a flux change in the core pair linked by the row coil 122' and the half-amplitude drive pulse from the column driver switch causes an opposite flux change in the core pair linked by the column coil 132'. The net magnetizing force generated by these two drive pulses in the selected memory core is insufficient to turn over the memory core. Upon the termination of these drive pulses, the logic control unit 150 furnishes a second, full-amplitude balanced drive pulse comprising a first negative phase and a second positive phase to the row driver switch 154. This drive pulse is passed by the prime core pair of the row driver switch and one primed core pair of the row switch 126 to the row coil 122'. No half-amplitude drive pulse is applied to the column switch 134 which is associated with the memory plane M1. The second balanced drive pulse on the row coil 122' generates sufficient magnetizing force to excite the desired memory core in the memory plane M1 first to the state N, and then to the state P. Therefore, a binary one is stored in this core.

The logic control unit 150 does or does not furnish a half-amplitude, balanced drive pulse to the respective column switches 134 in accordance with the binary digits in the word position. Thus, if a binary zero is in the word position corresponding to a memory plane, a half-amplitude, balanced drive pulse is applied to the associated column switch during the time interval of the second full-amplitude, balanced pulse on the row coil 122'. If a binary one is in the word position corresponding to a memory plane, a half-amplitude, balanced drive pulse is applied to the associated column switch during the time interval of the first full-amplitude, balanced pulse on the row coil 122'.

Information may be read out of any desired memory core by applying similar, first and second full-amplitude balanced drive pulses to the row switch 126, and observing the voltage induced in the respective sensing windings 140. Thus, if an interrogated memory core is storing a binary one, represented by the state P, substantially no change in its saturation condition is produced during the first positive phase. Consequently, substantially no voltage is induced in the coupled sensing winding 140 during the first phase, thereby indicating that a binary one is stored in the interrogated memory core. If, however, the interrogated memory core is storing a binary zero, represented by the state N, the first phase of the full-amplitude drive pulse produces sufficient magnetizing force to drive it to the state P. Consequently, a relatively high voltage is induced in the coupled sensing winding 140 during the first positive phase.

In the case of a binary zero, the negative phase of the drive pulse returns the interrogated memory core to the state N and the information stored in the memory core is not destroyed. However, in the case of a binary one, the neagative phase of the full-amplitude pulse brings the interrogated memory core to the state N and the information is destroyed. The information can be written back into or restored in the interrogated memory core by means of the restore circuitry 146. For example, when a binary zero is read out, the relatively high voltage induced in the sensing winding 140 during the first phase of the full-amplitude drive pulse is used to prime a gate. There is a separate gate for each memory plane M1—M16 in the restore circuitry 146. A half-amplitude balanced pulse comprising a first, positive phase and a second, negative phase is applied to the restore circuitry 147 by the logic control unit 150 via the conductor 165. The half-amplitude balanced drive pulse then is passed through the primed gate of the restore circuitry 146 and is applied to the column drive switch 156 of the associated memory plane via a conductor 167 during the time interval of the second, full-amplitude drive pulse from the row switch 126. Therefore, the half-amplitude, drive pulse inhibits the drive pulse from the row switch 126 from changing the state of the interrogated core. When a binary one is read out, the relatively low voltage induced in the coupled sensing winding 140 does not prime the gate of the restore circuitry 147. Therefore, the half-amplitude, drive pulse is not passed and the second, full-amplitude pulse from the row switch 126 succeeds in restoring the binary one in the interrogated memory core.

There has been described herein an improved magnetic switching system which furnishes a balanced output pulse on a selected one of a plurality of output coils. There has also been described arrangements of a plurality of switches according to the invention in magnetic memory systems for providing improved access time and simplified methods of writing information into and reading information out of such systems.

What is claimed is:

1. A switching system comprising a plurality of magnetic core pairs, each core of said core pairs comprising a magnetic material characterized by having a substantially rectangular hysteresis loop, means for applying currents to magnetically saturate each core, means for applying a bias sufficient to excite each core to a substantially zero induction condition, means for selectively removing said currents from the two cores of one said pair thereby permitting said bias to bring said one pair to a zero induction condition, and means for applying to every core pair a drive pulse having a first phase of one polarity and a second phase of the opposite polarity, said drive pulse being applied to the respective cores of each said pair in opposite senses.

2. In a memory system having a plurality of memory cores, each of said cores comprising a magnetic material characterized by having a substantially rectangular hysteresis loop, first and second windings linking different ones of said memory cores, selecting means for selecting desired ones of said memory cores, said selecting means comprising means for producing a first drive pulse on one of said first windings linking all said desired memory cores, and means for producing a second drive pulse on selected ones of said second windings, each second winding linking at least one of said desired memory cores said first and second drive pulses each having first and second phases of opposite polarities.

3. In a memory system in accordance with claim 2 wherein said first drive pulse comprises a first full-amplitude phase of one polarity and a second full-amplitude phase of the opposite polarity and said second drive pulse comprises first and second phases each, respectively, of approximately one-half the amplitude and of an opposite polarity to said first and second phases of said first drive pulse.

4. In a memory system in accordance with claim 2 wherein said means for producing said first drive pulse includes a magnetic switch having a plurality of core pairs, each core of said core pairs comprising a magnetic material characterized by having a substantially rectangular hysteresis loop, each pair having an output winding coupled to an individual one of said first windings, means for biasing the respective cores of a selected one of said core pairs substantially to a zero induction condition while holding the respective cores of said non-selected pairs in a substantially saturated condition, and means for applying a drive pulse to all said core pairs.

5. In a memory system in accordance with claim 2 wherein said memory cores are arranged in a plurality of rectangular arrays, each array having rows and columns, means linking a different one of said first windings to a corresponding row in each array, and means linking a different one of said second windings to every core in a respective one of said arrays.

6. In a memory system having a plurality of memory cores individually identifiable as corresponding to the elements of an array arranged in rows and columns, a first switch means having a plurality of magnetic core pairs, each pair having an output coil respectively linked to all the elements corresponding to a row of memory cores, a second switch means having a plurality of magnetic core pairs, each pair having an output coil respectively linked to all the elements corresponding to a column of memory cores, each core of said core pairs of said first and second switch means comprising a magnetic material characterized by having a substantially rectangular hysteresis loop, means for selecting the core pair of said first switch means and the core pair of said second switch whose output coils are linked to said desired memory core, bias means for driving each core of said selected core pairs substantially to a zero induction condition, and drive means for applying a drive pulse having a first phase of one polarity and a second phase of the opposite polarity to said first and second switch means thereby to induce a drive pulse having a first phase of one polarity and a second phase of the opposite polarity in said output coil of said selected core pair of said first and second switch means and thereby exciting said desired memory core.

7. A memory system as recited in claim 6, each said drive pulse comprising a first phase of the same one polarity and a second phase of the opposite polarity.

8. A magnetic switch comprising a plurality of core pairs, each core of said core pairs comprising a magnetic material characterized by having a substantially rectangular hysteresis loop, selecting coils linked in combinatorial fashion to groups of said core pairs for selecting one pair in each group, a bias coil linked to every core pair for driving the two cores of said selected pairs substantially to a zero induction condition, a plurality of drive coils each linked to every core pair in an individual one of said groups, and means for applying a drive pulse having a first phase of one polarity and a second phase of the opposite polarity to a selected one of said drive coils thereby driving the two cores of said selected core pair in one of said groups.

9. A magnetic switch as recited in claim 8, said drive coils being linked to the two cores of each core pair in series opposition, and including a plurality of output coils each linked to the two cores of an individual one of said core pairs in series opposition.

10. A magnetic switch as recited in claim 8, each said selecting coils being linked to the two cores of a core pair in series aiding relation.

11. In a memory system having a plurality of memory cores, each of said cores comprising a magnetic material characterized by having a substantially rectangular hysteresis loop, a first and a second winding each linking a different group of said cores, one of said cores being common to two of said different groups and one or more of said cores not common to said two groups, selecting means for selecting said one core, said selecting means comprising means for producing a first drive pulse on said first winding, and means for producing a second drive pulse on said second winding, said first and second drive pulses each having first and second phases of opposite polarities.

12. In a memory system, the combination comprising a magnetic switch having pairs of magnetic cores, each of said cores being characterized by having a substantially rectangular hysteresis loop, said core pairs having windings wound thereon in a manner tending to cancel disturbing voltages induced in said windings due to the selection of one of said core pairs, means for selecting a desired one of said core pairs comprising means for applying magnetizing forces to all said cores in a direction to drive said cores to a substantially saturated condition, and means for removing said currents from selected ones of said windings linked to said desired core pair, thereby driving the cores of said selected pair to a substantially zero induction condition.

13. In a memory system, the combination comprising a magnetic switch having pairs of magnetic cores, each of said cores being characterized by having a substantially rectangular hysteresis loop and each of said core pairs having windings wound thereon in a manner tending to cancel disturbing voltages due to the selection of a desired one of said core pairs, and means for selecting said desired core pair comprising means for applying currents to said windings to drive said cores to a substantially saturated condition, and means for removing said currents from selected ones of said windings, thereby driving the cores of said selected pair to a substantially zero induction condition, and means for applying a magnetizing force of one polarity to one core of each of said core pairs, and a magnetizing force of the opposite polarity to the other core of each of said core pairs.

14. In a memory system having an array of magnetic cores, each of said cores being of substantially rectangular hysteresis loop material and each of said cores having drive windings and a sensing winding linked thereto, the combination comprising means for applying a first drive pulse having a first phase of one polarity and a second phase of the opposite polarity to one of said drive windings of a desired one of said cores, and means responsive to the voltage induced in said sensing winding during the first phase of the first drive pulse for selectively applying a second drive pulse whose phases are opposite to those of said first drive pulse to another of said drive windings of said desired core.

15. In a magnetic switch having core pairs and windings wound on the cores of said core pairs, each of said cores being of substantially rectangular hysteresis loop magnetic material and each of said cores having two directions of saturation, the combination comprising means for magnetizing each of said cores to one of said directions of saturation, means for applying a bias current to each of said cores in a direction to drive a core towards the other of said directions of saturation, and means for removing the magnetizing force from a selected core pair, said bias current operating to bring each of the cores of said selected core pairs to a substantially zero induction condition, and means for applying a drive pulse having a first phase of one polarity and a second phase of the opposite polarity to each of said cores, said drive pulse operating to magnetize the two cores of each pair towards opposite directions of saturation.

16. In a memory system, the combination comprising a magnetic switch having pairs of magnetic cores, each of said cores being characterized by heaving a substantially rectangular hysteresis loop, means for selecting a desired one of said core pairs comprising means for applying selecting currents to every core, said selecting current operating to drive each of said cores to one direction of saturation, means for applying a bias current having an amplitude sufficient to bring each of said cores to a substantially zero induction condition in the absence of said selecting currents, means for removing said selecting currents from said selected core pair, and means for applying a drive pulse having alternate phases to each of said cores, thereby causing said selected core pair to produce an output pulse having alternate phases.

References Cited in the file of this patent

UNITED STATES PATENTS

| | | |
|---|---|---|
| 2,666,151 | Rajchman | Jan. 12, 1954 |
| 2,691,152 | Stewart-Williams | Oct. 5, 1954 |
| 2,691,153 | Rajchman | Oct. 5, 1954 |
| 2,691,154 | Rajchman | Oct. 5, 1954 |
| 2,691,155 | Rosenberg | Oct. 5, 1954 |
| 2,700,155 | Clayton | Jan. 18, 1955 |